(12) United States Patent
Doi et al.

(10) Patent No.: US 9,145,137 B2
(45) Date of Patent: Sep. 29, 2015

(54) VEHICLE DRIVING-SUPPORT APPARATUS

(75) Inventors: Tomoyuki Doi, Toyota (JP); Kenji Tadakuma, Toyota (JP); Mitsuhisa Shida, Fuji (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/376,623

(22) PCT Filed: Apr. 7, 2010

(86) PCT No.: PCT/JP2010/056331
§ 371 (c)(1),
(2), (4) Date: Dec. 7, 2011

(87) PCT Pub. No.: WO2011/125193
PCT Pub. Date: Oct. 13, 2011

(65) Prior Publication Data
US 2013/0096773 A1 Apr. 18, 2013

(51) Int. Cl.
*G05D 1/00* (2006.01)
*G06F 19/00* (2011.01)
(Continued)

(52) U.S. Cl.
CPC ............... *B60W 30/00* (2013.01); *B60W 30/12* (2013.01); *B60W 40/1005* (2013.01); *G01M 9/06* (2013.01); *B60W 2530/16* (2013.01); *B60Y 2400/92* (2013.01)

(58) Field of Classification Search
CPC ..... B60W 30/00; B60W 30/12; B60W 30/16; B60W 40/109; B60W 40/1005; B60W 2530/16; H01L 2251/562; H01L 27/3246; H01L 51/5088; H01L 51/5056; H01L 51/5072; H01L 51/56; G01M 9/06; B60Y 2400/92
USPC ........................ 701/36, 123, 300–302, 96, 49; 180/14.1, 271; 340/435, 439
See application file for complete search history.

(56) References Cited

U.S. PATENT DOCUMENTS 4,987,542 A * 1/1991 Tran .................................. 701/1
5,379,218 A 1/1995 Jacobi et al.
(Continued)

FOREIGN PATENT DOCUMENTS

DE 41 27 725 2/1993
DE 103 61 969 6/2005
(Continued)

OTHER PUBLICATIONS

International Search Report in International Application No. PCT/JP2010/056331; Mailing Date: Jul. 20, 2010.

*Primary Examiner* — Fadey Jabr
*Assistant Examiner* — Angelina Shudy
(74) *Attorney, Agent, or Firm* — Finnegan, Henderson, Farabow, Garrett & Dunner, LLP

(57) ABSTRACT

In a vehicle travel support device 10, an ECU 4 includes an air resistance distribution acquisition unit 41, a target traveling position determination unit 43, and a travel support unit 44. The air resistance distribution acquisition unit 41 acquires air resistance distribution in the left and right directions of a host vehicle. The target traveling position determination unit 43 determines a target traveling position of the host vehicle against a preceding vehicle using the air resistance distribution. The travel support unit 44 performs support to guide the host vehicle to the target traveling position. According to this vehicle travel support device 10, even if an area in which a large aerodynamic effect is obtained by a preceding vehicle deviates in the left and right directions of the host vehicle, the host vehicle can be guided to a position corresponding to the deviation. Because of this, the fuel efficiency can be effectively improved.

3 Claims, 7 Drawing Sheets

(51) Int. Cl.

| | | |
|---|---|---|
| *G06F 17/10* | (2006.01) | |
| *B60Q 1/00* | (2006.01) | |
| *B60W 30/00* | (2006.01) | |
| *B60W 30/12* | (2006.01) | |
| *B60W 40/10* | (2012.01) | |
| *G01M 9/06* | (2006.01) | |

(56) References Cited

U.S. PATENT DOCUMENTS

| | | | | |
|---|---|---|---|---|
| 5,777,451 | A * | 7/1998 | Kobayashi et al. | 318/587 |
| 5,878,361 | A * | 3/1999 | Sekine et al. | 701/41 |
| 5,908,217 | A * | 6/1999 | Englar | 296/180.1 |
| 5,926,126 | A * | 7/1999 | Engelman | 342/70 |
| 6,032,097 | A * | 2/2000 | Iihoshi et al. | 701/96 |
| 6,057,754 | A * | 5/2000 | Kinoshita et al. | 340/435 |
| 6,092,021 | A * | 7/2000 | Ehlbeck et al. | 701/123 |
| 6,175,799 | B1 * | 1/2001 | Tsutsumi et al. | 701/96 |
| 6,269,308 | B1 * | 7/2001 | Kodaka et al. | 701/301 |
| 6,311,123 | B1 * | 10/2001 | Nakamura et al. | 701/96 |
| 6,317,692 | B2 * | 11/2001 | Kodaka et al. | 701/301 |
| 6,317,693 | B2 * | 11/2001 | Kodaka et al. | 701/301 |
| 6,324,465 | B1 * | 11/2001 | Teramura et al. | 701/96 |
| 6,347,274 | B2 * | 2/2002 | Kuramochi et al. | 701/96 |
| 6,459,991 | B1 * | 10/2002 | Takiguchi et al. | 701/301 |
| 6,600,986 | B2 * | 7/2003 | Steinle et al. | 701/70 |
| 6,665,603 | B2 * | 12/2003 | Jindo et al. | 701/96 |
| 6,683,533 | B1 * | 1/2004 | Ashihara et al. | 340/435 |
| 6,805,216 | B2 * | 10/2004 | Noecker | 180/170 |
| 6,894,606 | B2 * | 5/2005 | Forbes et al. | 340/435 |
| 7,024,306 | B2 * | 4/2006 | Minami et al. | 701/123 |
| 7,765,058 | B2 * | 7/2010 | Doering | 701/123 |
| 8,014,928 | B2 * | 9/2011 | Mills et al. | 701/96 |
| 8,155,868 | B1 * | 4/2012 | Xing et al. | 701/123 |
| 2001/0018631 | A1 * | 8/2001 | Kuramochi et al. | 701/96 |
| 2002/0014988 | A1 * | 2/2002 | Samukawa et al. | 342/70 |
| 2002/0152009 | A1 * | 10/2002 | Bartoli | 701/29 |
| 2002/0169538 | A1 * | 11/2002 | Yamamura et al. | 701/96 |
| 2003/0011508 | A1 * | 1/2003 | Kishida et al. | 342/70 |
| 2003/0120414 | A1 * | 6/2003 | Matsumoto et al. | 701/96 |
| 2003/0225519 | A1 * | 12/2003 | Miyahara | 701/301 |
| 2004/0117090 | A1 * | 6/2004 | Samukawa et al. | 701/45 |
| 2004/0193347 | A1 * | 9/2004 | Harumoto et al. | 701/45 |
| 2005/0125153 | A1 * | 6/2005 | Matsumoto et al. | 701/300 |
| 2005/0159876 | A1 * | 7/2005 | Sugano | 701/96 |
| 2005/0236210 | A1 * | 10/2005 | Kawazoe et al. | 180/272 |
| 2005/0288850 | A1 * | 12/2005 | Sato | 701/123 |
| 2006/0229793 | A1 * | 10/2006 | Sawamoto et al. | 701/96 |
| 2007/0021876 | A1 * | 1/2007 | Isaji et al. | 701/1 |
| 2007/0032929 | A1 * | 2/2007 | Yoshioka et al. | 701/35 |
| 2007/0219681 | A1 * | 9/2007 | Kumar et al. | 701/19 |
| 2008/0091318 | A1 * | 4/2008 | Deng et al. | 701/41 |
| 2008/0091321 | A1 * | 4/2008 | Nishikawa | 701/44 |
| 2009/0182505 | A1 * | 7/2009 | Ikeda | 701/301 |
| 2009/0312923 | A1 | 12/2009 | Mills et al. | |
| 2010/0020170 | A1 * | 1/2010 | Higgins-Luthman et al. | 348/135 |
| 2010/0023223 | A1 * | 1/2010 | Huang et al. | 701/44 |
| 2010/0023245 | A1 * | 1/2010 | Huang et al. | 701/117 |
| 2010/0055649 | A1 * | 3/2010 | Takahashi et al. | 434/66 |
| 2010/0209882 | A1 * | 8/2010 | Lin et al. | 434/65 |
| 2011/0205044 | A1 * | 8/2011 | Enomoto et al. | 340/439 |
| 2011/0251768 | A1 * | 10/2011 | Luo et al. | 701/70 |
| 2011/0257869 | A1 * | 10/2011 | Kumar et al. | 701/103 |
| 2011/0270514 | A1 * | 11/2011 | Shida | 701/117 |
| 2013/0030602 | A1 * | 1/2013 | Joeng | 701/1 |
| 2013/0080018 | A1 * | 3/2013 | Baek | 701/96 |
| 2013/0080019 | A1 * | 3/2013 | Isaji et al. | 701/96 |
| 2013/0282277 | A1 * | 10/2013 | Rubin et al. | 701/517 |

FOREIGN PATENT DOCUMENTS

| | | | |
|---|---|---|---|
| EP | 2390857 A1 * | 11/2011 | |
| JP | 2003042000 A * | 2/2003 | |
| JP | 2004314849 A * | 11/2004 | |
| JP | 2005-35349 | 2/2005 | |
| JP | 2005263058 A * | 9/2005 | |
| JP | 2007-283837 | 11/2007 | |
| JP | 2008-275500 | 11/2008 | |
| JP | 2008275500 A * | 11/2008 | |
| JP | 2009-157790 | 7/2009 | |
| JP | 2009157790 A * | 7/2009 | |
| JP | 2009248865 A * | 10/2009 | |
| WO | WO 2010084569 A1 * | 7/2010 | |

* cited by examiner

Fig.4
(a)
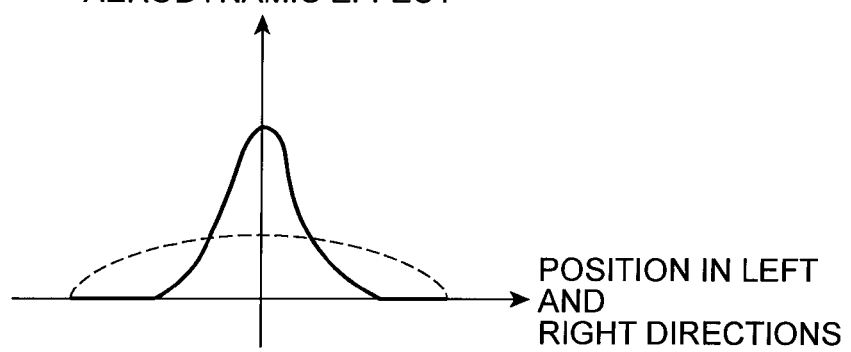
(b)
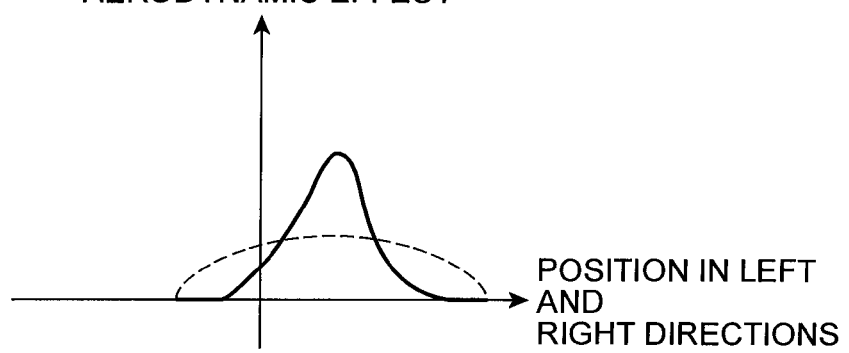
(c)
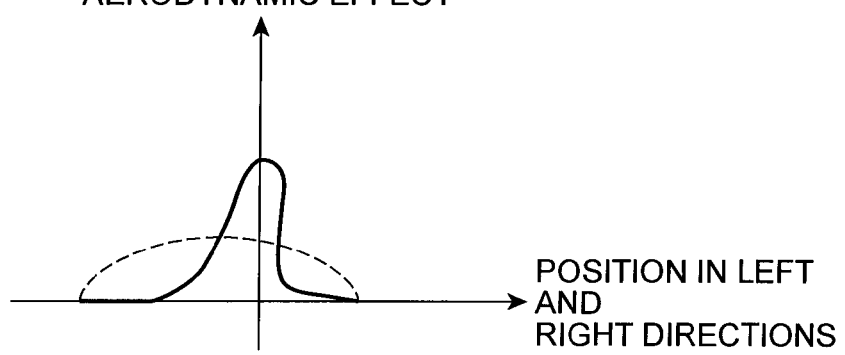

VEHICLE DRIVING-SUPPORT APPARATUS

CROSS-REFERENCE TO RELATED APPLICATIONS

This application is a national phase application of International Application No. PCT/JP2010/056331, filed Apr. 7, 2010, the contents of which are incorporated herein by reference.

TECHNICAL FIELD

The present invention relates to a vehicle travel support device that performs travel support of a vehicle.

BACKGROUND ART

In the related art, as a vehicle travel support device, a rank traveling system is known which reduces energy consumption of the entire rank through organization of the ranks according to the projected areas of the respective vehicles in the wind flowing direction during the rank traveling of plural vehicles, for example, as described in Patent Literature 1. In this rank traveling system, in a case where the rank is one row, vehicles having a relatively large projected area are arranged in front, and just behind the front vehicle, vehicles having a relatively small projected area are arranged.

CITATION LIST

Patent Literature

Patent Literature 1: Japanese Unexamined Patent Application Publication No. 2009-157790

SUMMARY OF INVENTION

Technical Problem

However, even in the case of organizing and traveling in a single rank, the area just behind the preceding vehicle may not be the area in which an aerodynamic effect becomes largest, and thus in the above-described rank traveling system, an improvement in fuel efficiency may not be effectively achieved.

Therefore, it is an object of the present invention to provide a vehicle travel support device that can effectively improve fuel efficiency.

Solution to Problem

A vehicle travel support device according to the present invention includes air resistance distribution acquisition means for acquiring air resistance distribution in the left and right directions of a host vehicle; target traveling position determination means for determining a target traveling position of the host vehicle against a preceding vehicle using the air resistance distribution; and travel support means for performing support to guide the host vehicle to the target traveling position.

In general, although it is considered that the area just behind the preceding vehicle may be the area in which the aerodynamic effect becomes largest, for example, due to the influence of crosswind or the like, the area in which the aerodynamic effect becomes largest may deviate in the left and right directions from directly behind the preceding vehicle. According to the vehicle travel support device, the support is performed so as to acquire the air resistance distribution in the left and right directions of the host vehicle, to determine the target traveling position of the host vehicle against the preceding vehicle using the air resistance distribution, and to guide the vehicle to the target traveling position, and thus even if the area in which a large aerodynamic effect is obtained by the preceding vehicle deviates in the left and right directions of the host vehicle, the host vehicle can be guided to a position corresponding to the deviation. Because of this, the fuel efficiency can be effectively improved.

Preferably, the air resistance distribution acquisition means may further acquire the air resistance distribution in forward and backward directions of the host vehicle.

In this case, since the air resistance distribution in the forward and backward directions is acquired in addition to the air resistance distribution in the left and right directions, and the target traveling position is determined using the air resistance distribution, the fuel efficiency can be more effectively improved.

At this time, preferably, the target traveling position determination means may determine the target traveling position according to a control performance of behavior in the left and right directions of the host vehicle.

In general, the control performance of the behavior in the left and right directions of the vehicle differs for each vehicle in accordance with diverse factors, such as a response performance of the vehicle, driving skills of a driver, and the like. Due to this, by determining the target traveling position according to the control performance of the behavior in the left and right directions of the host vehicle, it becomes possible to guide the host vehicle to a position in which the fuel efficiency can be stably improved regardless of the low and high control performance.

Preferably, the vehicle travel support device according to the present invention may further include environmental information acquisition means for acquiring environmental information around the host vehicle, and the target traveling position determination means may determine the target traveling position on the basis of the air resistance distribution and the environmental information.

In this case, since the environmental information of the host vehicle is acquired, the target traveling position may be obtained according to the environment around the host vehicle.

Preferably, the vehicle travel support device according to the present invention may further include traveling risk detection means for detecting traveling risks at each position around the host vehicle, and the target traveling position determination means may determine the target traveling position so as to minimize the traveling risk.

For example, by determining the target traveling position so as to minimize the traveling risk through detection of the traveling risk, such as contact between a neighboring vehicle and the host vehicle, deviation of the host vehicle to the outside of a traveling lane, the traveling of the host vehicle that is appropriate to the surrounding environment and the improvement in fuel efficiency can coexist with each other.

More preferably, the traveling risk detection means may further include means for calculating a fuel efficiency improvement rate contour on which the fuel efficiency improvement rate becomes constant at a predetermined target value of the fuel efficiency improvement rate on the basis of the air resistance distribution, and means for calculating the traveling risk of the host vehicle at each position on the fuel efficiency improvement rate contour.

In this case, the traveling of the host vehicle that is appropriate to the surrounding environment and the improvement in fuel efficiency can coexist with each other through a simple computation process.

Advantageous Effects of Invention

According to the present invention, a vehicle travel support device capable of effectively improving the fuel efficiency can be provided.

BRIEF DESCRIPTION OF DRAWINGS

FIG. 4 is a graph illustrating an example of the distribution of an aerodynamic effect that is obtained by a preceding vehicle.

DESCRIPTION OF EMBODIMENTS

Figure 1:
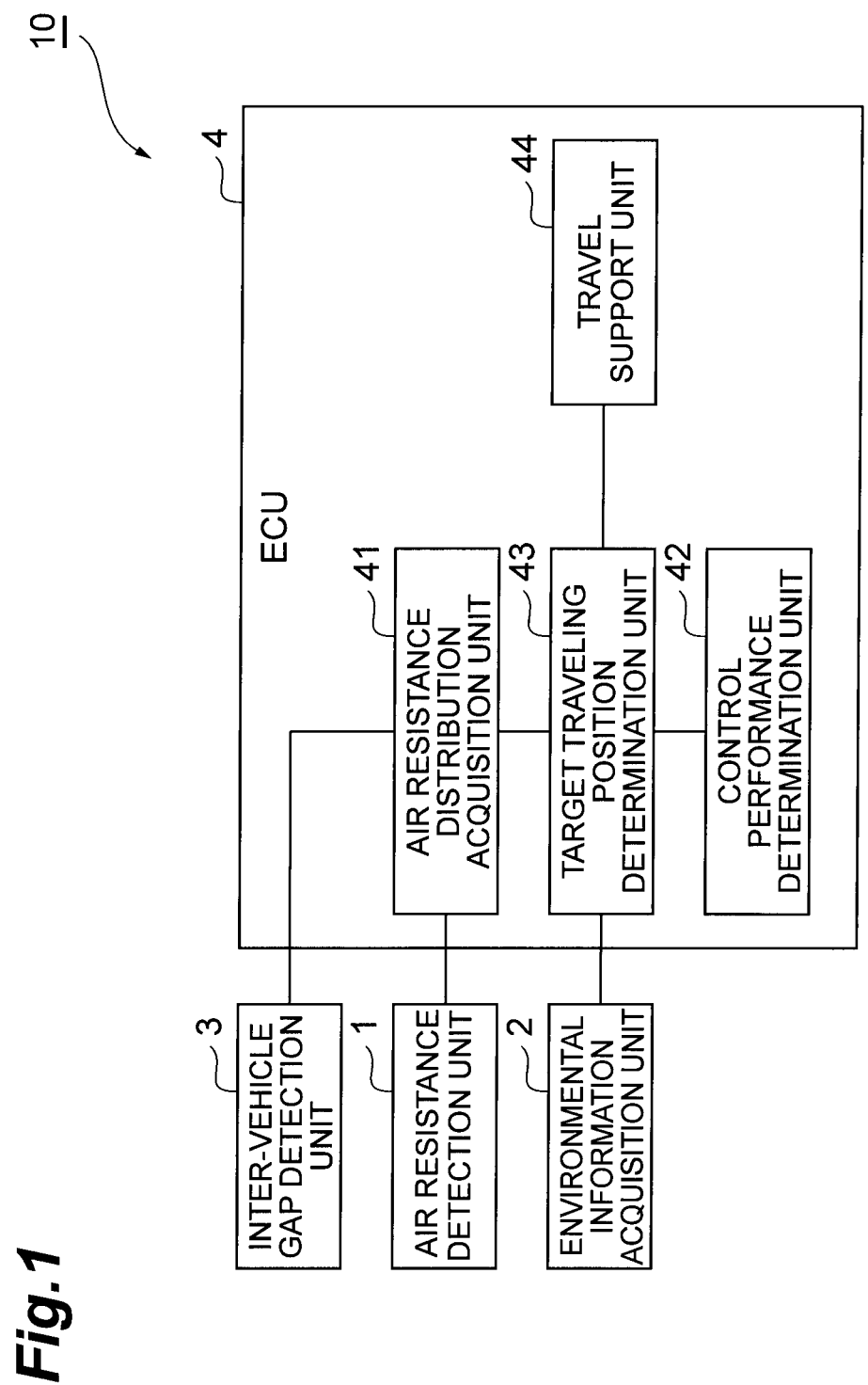
FIG. 1 is a block diagram illustrating the schematic configuration of a first embodiment of a vehicle travel support device according to the present invention.

Hereinafter, preferred embodiments of a vehicle travel support device according to the present invention will be described in detail with reference to the drawings. In explaining the drawings, if possible, the same reference numerals are given to the same constituent elements, and duplicate explanation thereof will be omitted.

First Embodiment

FIG. 1 is a block diagram illustrating the schematic configuration of a first embodiment of a vehicle travel support device according to the invention. In the drawing, the vehicle travel support device 10 according to this embodiment is, for example, a device that is mounted on a vehicle to perform a travel support of a host vehicle using the distribution of air resistance that is applied to the vehicle. Hereinafter, a vehicle on which the vehicle travel support device 10 is mounted is called a host vehicle.

As illustrated in FIG. 1, the vehicle travel support device 10 includes an air resistance detection unit 1, an environmental information acquisition unit (environmental information acquisition means) 2, a inter-vehicle gap detection unit 3, and an ECU (Electronic Control Unit) 4.

The air resistance detection unit 1 detects the air resistance that is applied to respective portions of the host vehicle. Specifically, the air resistance detection unit 1 has, for example, wind sensors or flow sensors installed on the respective portions of the host vehicle, and detects the air resistance that is applied to the respective portions of the host vehicle using such sensors. Further, the air resistance detection unit 1 transmits the result of detection to the ECU 4.

The environmental information acquisition unit 2 acquires environmental information around the host vehicle, and transmits the acquired environmental information to the ECU 4. The environmental information includes road information and weather information. The road information is information that indicates, for example, the position or the like of a tunnel or a bridge that is present on a road on which the host vehicle travels. The road information is acquired, for example, using a navigation system (not shown).

The weather information is information that indicates wind speed or wind power for each season or time in the vicinity of the host vehicle. The weather information is acquired, for example, by radio broadcasting or the AMeDAS of the weather bureau. Further, the weather information may be corrected on the basis of the past performance of the host vehicle that traveled alone (without any preceding vehicle that causes the aerodynamic effect). In this case, more probable weather information can be obtained.

The inter-vehicle gap detection unit 3, for example, has an inter-vehicle gap sensor such as a millimeter-wave radar or the like, and detects the inter-vehicle gap between the preceding vehicle and the host vehicle using the inter-vehicle gap sensor. Further, the inter-vehicle gap detection unit 3 transmits the result of detection to the ECU 4.

The ECU 4 is an electronic control unit that includes a CPU, ROM, RAM, and input/output port. In function, the ECU 4 includes an air resistance distribution acquisition unit (air resistance distribution acquisition means) 41, a control performance determination unit 42, a target traveling position determination unit (target traveling position determination means) 43, and a travel support unit (travel support means) 44.

The air resistance distribution acquisition unit 41 acquires the air resistance distribution in the left and right directions and in the forward and backward directions of the host vehicle. Specifically, the air resistance distribution acquisition unit 41 calculates the air resistance distribution in the left and right directions and in the forward and backward directions of the host vehicle in the current inter-vehicle gap on the basis of the results of detection performed by the air resistance detection unit 1 and the inter-vehicle gap detection unit 3. Further, the air resistance distribution acquisition unit 41 transmits information that indicates the air resistance distribution to the target traveling position determination unit 43.

The control performance determination unit 42 determines the control performance (to be described later) of the behavior in the left and right directions of the host vehicle. Further, the control performance determination unit 42 transmits the determination result of the control performance to the target traveling position determination unit 43.

The target traveling position determination unit 43 determines the target traveling position of the host vehicle against the preceding vehicle on the basis of the air resistance distribution acquired by the air resistance distribution acquisition unit 41 and the environmental information acquired by the environmental information acquisition unit 2. Specifically, the target traveling position determination unit 43 determines the target traveling position according to the determination result of the control performance determined by the control performance determination unit 42 using the air resistance distribution and the environmental information. Here, the target traveling position is a position in which the air resistance that is applied to the host vehicle is decreased. Further, the target traveling position determination unit 43 transmits information that indicates the target traveling position to the travel support unit 44.

The travel support unit 44 performs support to guide the host vehicle to the target traveling position. Specifically, the travel support unit 44, for example, presents information for encouraging the driver to move the host vehicle to the target traveling position to the driver through a screen display, or guides the host vehicle to the target traveling position through an acceleration pedal having reaction force or wheel torque control.

Figure 2:
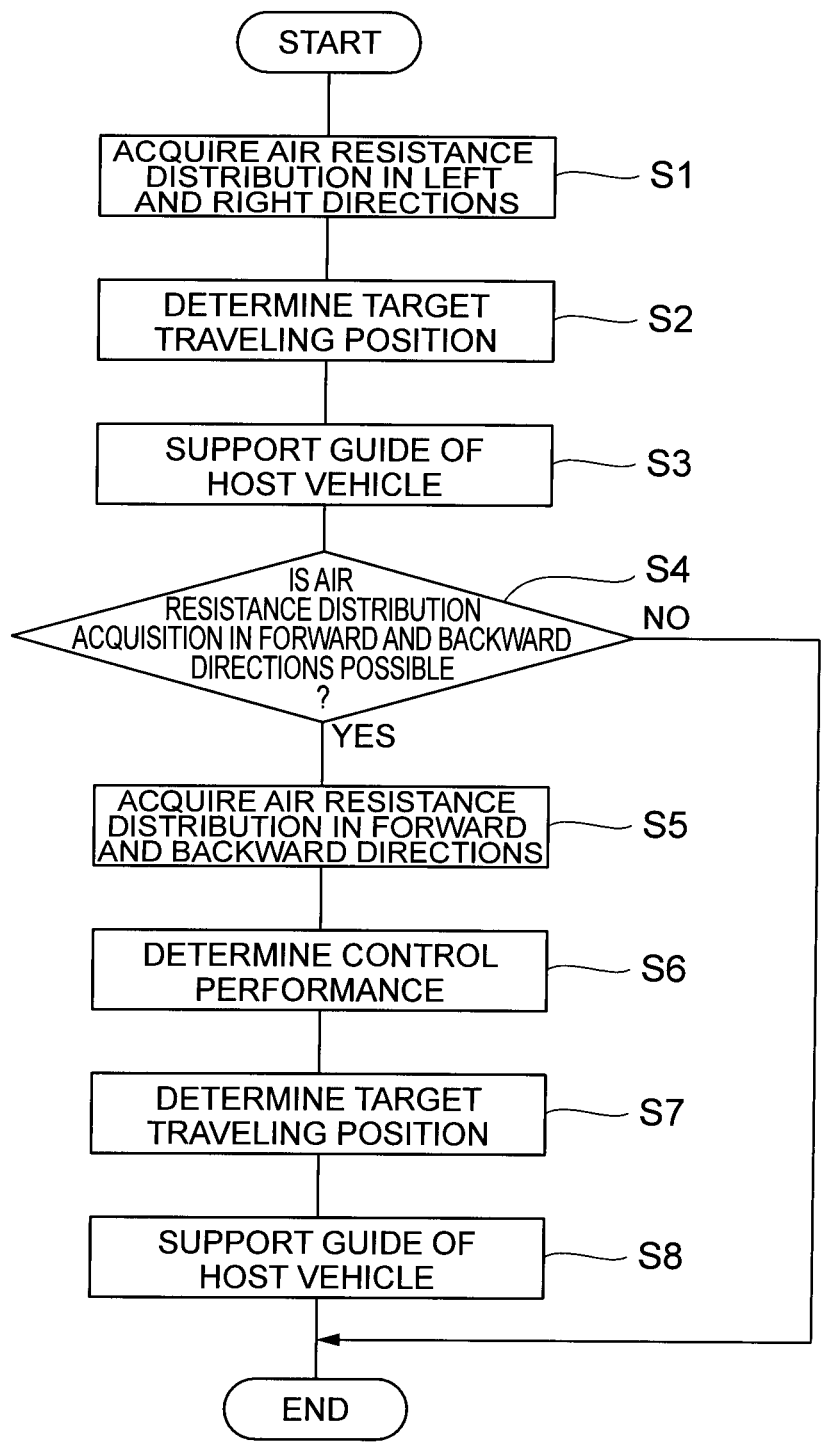
FIG. 2 is a flowchart illustrating a vehicle travel support processing procedure that is executed by an ECU illustrated in FIG. 1.

Next, referring to FIG. 2, a vehicle travel support processing procedure that is executed by an ECU 4 will be described.

In the drawing, first, the air resistance distribution in the left and right direction of the host vehicle is acquired on the basis of the air resistance which is applied to the respective portions of the host vehicle that is detected by the air resistance detection unit 1 (step S1).

Figure 3:
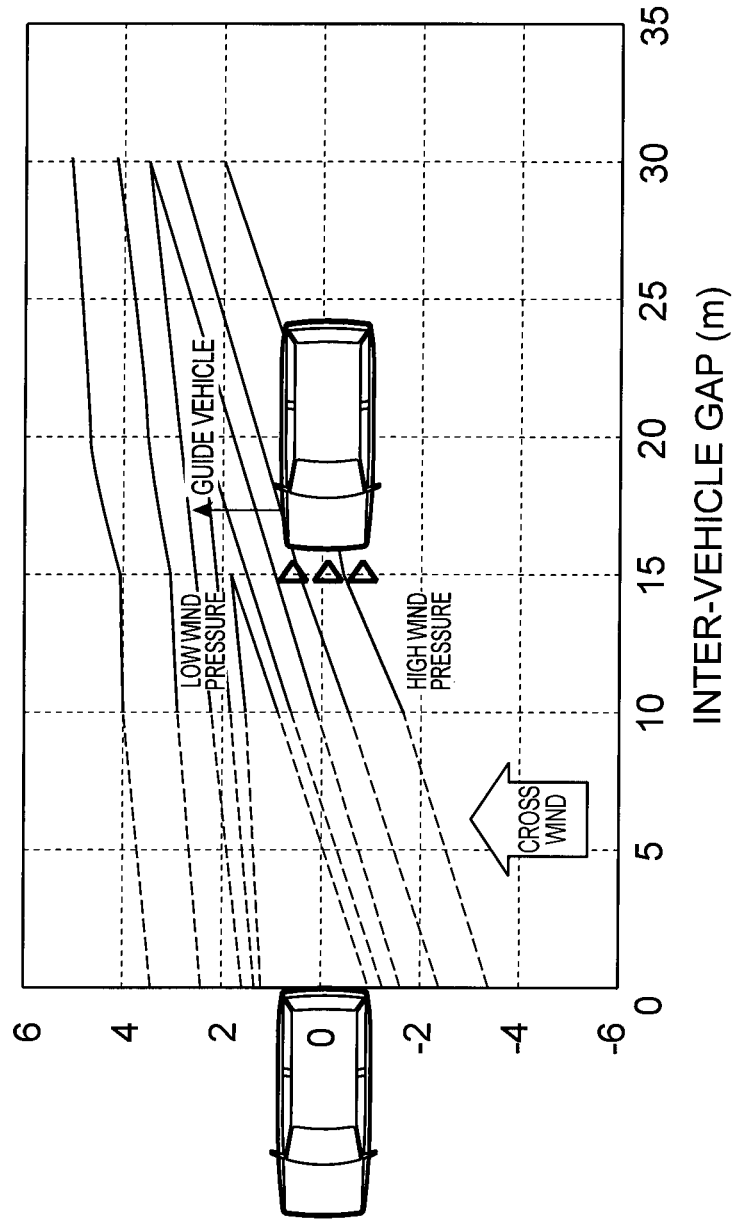
FIG. 3 is a diagram illustrating an example of a state of guiding a host vehicle to a position in which air resistance that is applied to the host vehicle is decreased.

Then, the position in which the air resistance that is applied to the host vehicle is decreased is determined as the target traveling position using the air resistance distribution acquired in step S1 (step S2). For example, as illustrated in FIG. 3, if the host vehicle is influenced by crosswind, the position in which the wind pressure becomes small becomes the target traveling position. Further, as illustrated in FIG. 3, the support is performed to guide the host vehicle to the target traveling position determined in step S2 (step S3).

Then, it is determined whether or not the air resistance distribution in the forward and backward directions of the host vehicle can be acquired (step S4). In step S4, if it is determined that the air resistance distribution in the forward and backward directions of the host vehicle is unable to be acquired, the vehicle travel support process is finished.

On the other hand, if it is determined that the air resistance distribution in the forward and backward directions of the host vehicle can be acquired in step S4, the air resistance distribution in the forward and backward directions of the host vehicle is acquired on the basis of the air resistance that is applied to the respective portions of the host vehicle detected by the air resistance detection unit 1 (step S5).

Then, the control performance of the behavior in the left and right directions of the host vehicle is determined (step S6). In the case where the host vehicle is in an automated driving state, the control performance is determined on the basis of the road recognition performance and response performance of the host vehicle or the road roughness situation. Further, in the case where the host vehicle is in an assist driving state, the control performance is determined on the basis of the assist performance of the host vehicle or the like. Further, in the case where the host vehicle is in a manual driving state, the control performance is determined on the basis of the driving skills of the driver.

Then, a target traveling position according to the control performance determined in step S6 is determined on the basis of the air resistance distribution acquired in steps S1 and S5 (step S7).

Here, the distribution of the aerodynamic effect that is obtained by the preceding vehicle differs according to the inter-vehicle gap with the preceding vehicle. FIG. 4 is a graph illustrating an example of the distribution of the aerodynamic effect that is obtained by the preceding vehicle. In respective graphs of FIG. 4, the horizontal axis represents a position in the left and right directions of the host vehicle in consideration of the preceding vehicle as the origin, and the vertical axis represents the size of the aerodynamic effect that is obtained by the preceding vehicle. Further, in the respective graphs of FIG. 4, a solid line indicates the distribution of the aerodynamic effect in the case where the inter-vehicle gap between the preceding vehicle and the host vehicle is relatively small, and the dashed line indicates the distribution of the aerodynamic effect in the case where the inter-vehicle gap between the preceding vehicle and the host vehicle is relatively large.

FIG. 4a shows the distribution of the aerodynamic effect if there is no influence of crosswind or the like, FIG. 4b shows the distribution of the aerodynamic effect that is changed due to the influence of the crosswind, and FIG. 4c shows the distribution of the aerodynamic effect that is changed due to the influence of a wall surface of a tunnel. As illustrated in the respective graphs of FIG. 4, if the inter-vehicle gap between the preceding vehicle and the host vehicle is relatively small, the distribution of the aerodynamic effect obtained by the preceding vehicle has the maximum value that is relatively large and a distribution width that is relatively narrow. On the other hand, if the inter-vehicle gap between the preceding vehicle and the host vehicle is relatively large, the distribution of the aerodynamic effect obtained by the preceding vehicle has the maximum value that is relatively small and a distribution width that is relatively wide.

Due to this, if the control performance of the behavior in the left and right directions of the host vehicle is high, a large aerodynamic effect can be obtained by considering the position in which the inter-vehicle gap is relatively small as the target traveling position. On the other hand, if the control performance of the behavior in the left and right directions of the host vehicle is low, a stable aerodynamic effect can be obtained by considering the position in which the inter-vehicle gap is relatively large as the target traveling position.

Further, support is performed so as to guide the host vehicle to the target traveling position that is determined in step S7 (step S8).

Further, in steps S2 and S7, the target traveling position may be corrected in consideration of the environmental information that is acquired by the environmental information acquisition unit 2. For example, if it is confirmed that the host vehicle travels within a tunnel through the road information that is included in the environmental information, the target traveling position may be corrected in consideration of changes in airflow through the wall surface of the tunnel.

As described above, the vehicle travel support device 10 related to this embodiment performs the support by acquiring the air resistance distribution in the left and right directions and in the forward and backward directions of the host vehicle, determining the target traveling position of the host vehicle against the preceding vehicle using the air resistance distribution, and guiding the vehicle to the target traveling position. Because of this, according to the vehicle travel support device 10, even if the area in which a large aerodynamic effect is obtained by the preceding vehicle deviates in the left and right directions of the host vehicle, the host vehicle can be guided to a position corresponding to the deviation. As a result, the fuel efficiency can be effectively improved.

Further, since the vehicle travel support device 10 determines the target traveling position according to the control performance of the behavior in the left and right directions of the host vehicle, it becomes possible to guide the host vehicle to a position in which the fuel efficiency can be stably improved regardless of the low and high control performance.

Second Embodiment

Figure 5:
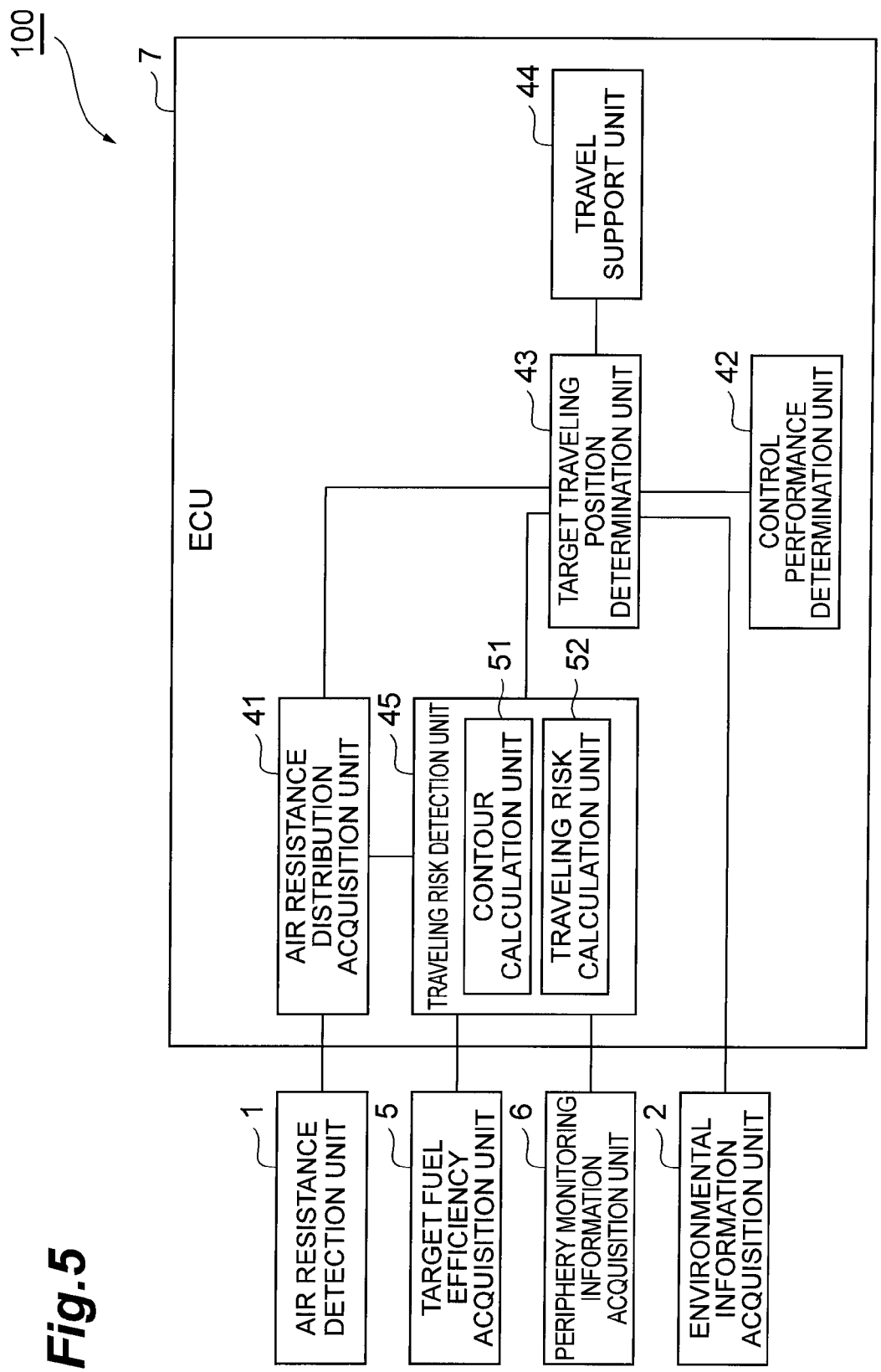
FIG. 5 is a block diagram illustrating the schematic configuration of a second embodiment of a vehicle travel support device according to the invention.

FIG. 5 is a block diagram illustrating the schematic configuration of a second embodiment of a vehicle travel support device according to the present invention. In the same drawing, the vehicle travel support device 100 according to this embodiment is, for example, a device that is mounted on a vehicle to perform a travel support of the vehicle using the distribution of air resistance that is applied to the vehicle. Hereinafter, a vehicle on which the vehicle travel support device 100 is mounted is called a host vehicle.

As illustrated in FIG. 5, the vehicle travel support device 100 includes an air resistance detection unit 1, an environmental information acquisition unit 2, a target fuel efficiency acquisition unit 5, a periphery monitoring information acquisition unit 6, and an ECU 7.

As described above, the air resistance detection unit 1 detects the air resistance that is applied to the respective portions of the host vehicle, and transmits the result of detection to the ECU 7. Further, as described above, the environmental information acquisition unit 2 acquires the environmental information surrounding the host vehicle and transmits the environmental information to the ECU 7.

The target fuel efficiency acquisition unit 5 sets a target value of the fuel efficiency improvement rate (target fuel efficiency improvement rate) to be achieved by the vehicle travel support device 100. For example, the target fuel efficiency improvement rate is set by a driver through a predetermined input device (not shown). Further, the target fuel efficiency acquisition unit 5 transmits information that indicates the set target fuel efficiency improvement rate to the ECU 7.

For example, the periphery monitoring information acquisition unit 6 acquires periphery monitoring information through millimeter-wave radar or a camera. For example, the periphery monitoring information includes information that indicates a position of a preceding vehicle, a width of a road on which the host vehicle travels, a position of a host vehicle on a road, and a position, a direction, or a speed of a neighboring vehicle including an oncoming vehicle. For example, the periphery monitoring information acquisition unit 6 may acquire such periphery monitoring information through road-to-vehicle communication or vehicle-to-vehicle communication using a predetermined communication device (not shown). Further the periphery monitoring information acquisition unit 6 transmits the periphery monitoring information to the ECU 7.

The ECU 7 is an electronic control unit that includes a CPU, ROM, RAM, and input/output port. In function, the ECU 7 includes an air resistance distribution acquisition unit 41, a control performance determination unit 42, a target traveling position determination unit 43, a traveling risk detection unit (traveling risk detection means) 45, and a travel support unit 44.

As described above, the air resistance distribution acquisition unit 41 acquires the air resistance distribution in the left and right directions and in the forward and backward directions of the host vehicle on the basis of the air resistance that is applied to the respective portion of the host vehicle acquired by the air resistance detection unit 1. Further, the air resistance distribution acquisition unit 41 transmits information that indicates the air resistance distribution to the traveling risk detection unit 45.

The traveling risk detection unit 45 detects traveling risks at each position surrounding the host vehicle on the basis of the periphery monitoring information acquired by the periphery monitoring information acquisition unit 6. Further, the traveling risk detection unit 45 transmits the information that indicates the traveling risks to the target traveling position determination unit 43. More specifically, the traveling risk detection unit 45 includes a contour calculation unit 51 and a traveling risk calculation unit 52.

The contour calculation unit 51 calculates a fuel efficiency improvement rate contour on which a fuel efficiency improvement rate becomes constant at a target fuel efficiency improvement rate on the basis of the air resistance distribution acquired by the air resistance distribution acquisition unit 41. The traveling risk calculation unit 52 calculates the traveling risk of the host vehicle in the respective positions on the fuel efficiency improvement rate contour. Further, for example, the traveling risk includes a contact risk between the host vehicle and a preceding vehicle, an oncoming vehicle or any other neighboring vehicle and a deviation risk of the host vehicle out of the traveling lane. For example, such a traveling risk may be calculated by the following equation.

$$\text{Traveling risk} = \epsilon_1 f(w) + \epsilon_2 g(x) + \epsilon_3 h(y) + \epsilon_4 k(z)$$

Here, w denotes a distance between a preceding vehicle and a host vehicle, x denotes a distance between an oncoming vehicle and a host vehicle, y denotes a distance between a host vehicle and a neighboring vehicle except for the preceding vehicle and the oncoming vehicle, and z denotes a distance until the host vehicle deviates out of the traveling lane. Further, f, g, h, and k are predetermined functions having variables of w, x, y, and z, respectively. Accordingly, f(w) indicates a contact risk between the preceding vehicle and the host vehicle, g(x) indicates a contact risk between the oncoming vehicle and the host vehicle, h(y) indicates a contact risk between the host vehicle and the neighboring vehicle except for the preceding vehicle and the oncoming vehicle, and k(z) indicates the deviation risk of the host vehicle out of the traveling lane. Further, $\epsilon_1$ to $\epsilon_4$ are parameters for weighting the respective risks.

The target traveling position determination unit 43 determines the target traveling position so as to minimize the calculated traveling risk as described above. Specifically, the target traveling position determination unit 43 determines a position in which the traveling risk becomes minimized among respective positions on the fuel efficiency improvement rate contour as the target traveling position.

Further, the target traveling position determination unit 43 may determine the target traveling position in consideration of the control performance of the behavior in the left and right directions of the host vehicle that is determined by the control performance determination unit 42.

Figure 6:
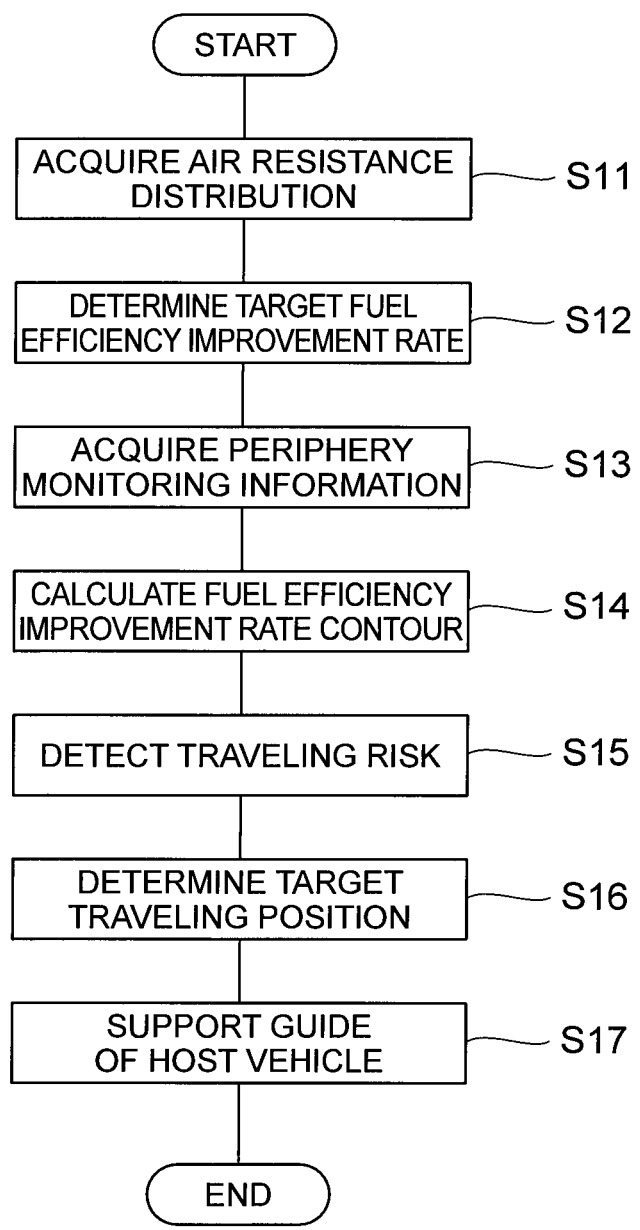
FIG. 6 is a flowchart illustrating a vehicle travel support processing procedure that is executed by an ECU illustrated in FIG. 5.

Next, referring to FIG. 6, a vehicle travel support processing procedure that is executed by an ECU 7 will be described.

In the drawing, first, the air resistance distribution in the left and right directions and in the forward and backward directions of the host vehicle is acquired on the basis of the air resistance which is applied to the respective portions of the host vehicle that is detected by the air resistance detection unit 1 (step S11). Then, the target fuel efficiency improvement rate that is set by the target fuel efficiency acquisition unit 5 is input (step S12). Then, the periphery monitoring information that is acquired by the periphery monitoring information acquisition unit 6 is input (step S13). The steps S11 to S13 may be executed in any order.

Figure 7:
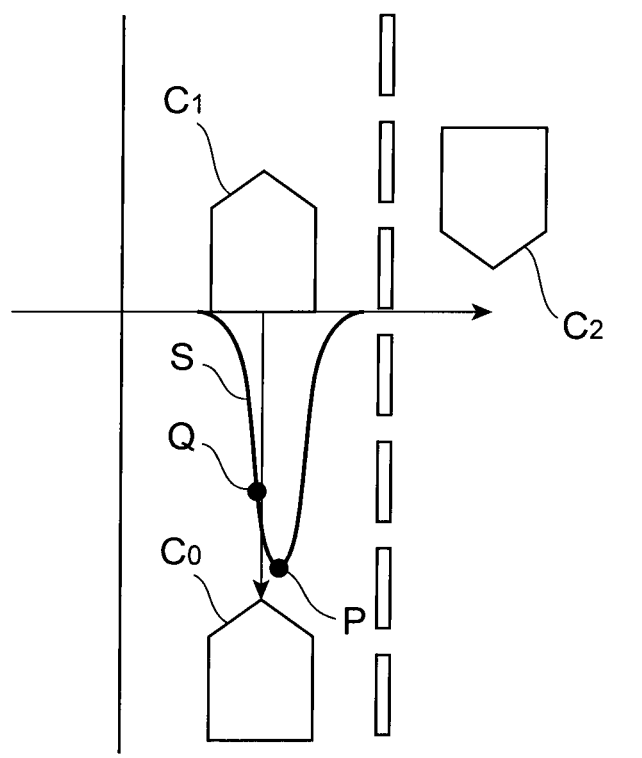
FIG. 7 is a diagram illustrating an example of a fuel efficiency improvement rate contour.

Then, on the basis of the air resistance distribution that is acquired in step S11, a fuel efficiency improvement rate contour on which a fuel efficiency improvement rate becomes constant at a target fuel efficiency improvement rate that is set in step S12 is calculated (step S14). At this time, the calculated fuel efficiency improvement rate contour, for example, is indicated by a solid line illustrated as a symbol S in FIG. 7. The horizontal axis and the vertical axis in FIG. 7 are coordinate axes in consideration of the preceding vehicle as the origin.

Then, the traveling risk of the host vehicle in the respective positions on the fuel efficiency improvement rate contour S calculated in step S14 is calculated (step S15).

Then, the position in which the traveling risk calculated in step S15 is minimized among the respective positions on the fuel efficiency improvement rate contour S calculated in step S14 is determined as the target traveling position (step S16). At this time, as illustrated in FIG. 7, the position in which the contact risk f(w) between the preceding vehicle $C_1$ and the host vehicle $C_0$ becomes minimized among the respective positions on the fuel efficiency improvement rate contour S becomes the position P in which the distance between the preceding vehicle $C_1$ and the host vehicle $C_0$ becomes maximized. However, if an oncoming vehicle $C_2$ approaches on the right side of the host vehicle, the position P becomes relatively close to the oncoming vehicle $C_2$, and thus the contact risk g(x) between the oncoming vehicle $C_2$ and the host vehicle $C_0$ becomes relatively large. Accordingly, the position (target traveling position) in which the traveling risk becomes minimized among the respective positions on the fuel efficiency improvement rate contour S becomes a position Q in which both the contact risk f(w) between the preceding vehicle $C_1$ and the host vehicle $C_0$ and the contact risk g(x) between the oncoming vehicle $C_2$ and the host vehicle $C_0$ become relatively small.

Then, the support is performed so as to guide the host vehicle to the target traveling position determined in step S16 (step S17).

Further, in step S16, the target traveling position may be determined in consideration of the environmental information that is acquired by the environmental information acquisition unit 2. Further, in step S16, the target traveling position may be determined in further consideration of the control performance of the behavior in the left and right directions of the host vehicle that is determined by the control performance determination unit 42.

As described above, the vehicle travel support device 100 acquires the air resistance distribution in the left and right directions and in the forward and backward directions of the host vehicle, and calculates the fuel efficiency improvement rate contour using the air resistance distribution. Further, the vehicle travel support device 100 determines the position on the fuel efficiency improvement rate contour as the target traveling position, and performs the support so as to guide the vehicle to the target traveling position. Because of this, even if the area in which a large aerodynamic effect is obtained by the preceding vehicle deviates in the left and right directions of the host vehicle, the host vehicle can be guided to a position corresponding to the deviation.

Further, the vehicle travel support device 100 calculates the traveling risks in the respective positions surrounding the host vehicle, and determines the position in which the traveling risk becomes minimized as the target traveling position. At this time, the vehicle travel support device 100 determines the position in which the traveling risk becomes minimized among the respective positions on the fuel efficiency improvement rate contour as the target traveling position. Because of this, according to the vehicle travel support device 100, both the traveling of the host vehicle that is appropriate to the surrounding environment and the improvement in fuel efficiency can coexist with each other.

Further, the present invention is not limited to the above-described embodiments. For example, if the target traveling position deviates from the center of the traveling lane when the support for guiding the host vehicle to the target traveling position is performed, the driver may be concerned about the corresponding guide. Because of this, an HMI (Human Machine Interface) for obtaining the determination of whether to perform the support to guide the host vehicle to the target traveling position from the driver may be further provided. It is preferable that this HMI be configured so that the driver can sensuously determine a position having a large aerodynamic effect through auditory, visual, and tactile senses.

INDUSTRIAL APPLICABILITY

A vehicle travel support device capable of effectively improving the fuel efficiency can be provided.

REFERENCE SIGNS LIST

2: environmental information acquisition unit
4, 7: ECU
41: air resistance distribution acquisition unit
42: control performance determination unit
43: target traveling position determination unit
44: travel support unit
45: traveling risk detection unit
51: contour calculation unit
52: traveling risk calculation unit

The invention claimed is:
1. A vehicle travel support device comprising:
an electronic control unit comprising a central processing unit, the electronic control unit including:
an air resistance detection unit configured to acquire an air resistance distribution in left and right directions of a host vehicle;
a target traveling position determination unit configured to determine a target traveling position of the host vehicle against a preceding vehicle using the air resistance distribution;
a travel support unit configured to guide the host vehicle to the target traveling position;
a traveling risk detection unit configured to detect traveling risks at each position around the host vehicle, the traveling risk detection unit comprising:
a contour calculation unit configured to calculate a fuel efficiency improvement rate contour on which the fuel efficiency improvement rate becomes constant at a predetermined target value of the fuel efficiency improvement rate on a basis of the air resistance distribution; and
a traveling risk calculation unit configured to calculate the traveling risk of the host vehicle at each position on the fuel efficiency improvement rate contour,
wherein the target traveling position determination unit determines the target traveling position so as to minimize the traveling risk,
the traveling risk is determined based on an equation wherein the traveling risk=$\epsilon_1 f(w) + \epsilon_2 g(x) + \epsilon_3 h(y) + \epsilon_4 k(z)$, f(w) is a function indicating contact risk between the preceding vehicle and the host vehicle, g(x) is a function indicating contact risk between an oncoming vehicle and the host vehicle, h(y) is a function indicating contact risk between the host vehicle and a neighboring vehicle, k(z) is a function indicating a deviation risk of the host vehicle out of the traveling lane, and $\epsilon_1, \epsilon_2, \epsilon_3$, and $\epsilon_4$ are risk weighting parameters,
the target traveling position determination unit, according to control performance of behavior in left and right direction of the host vehicle, obtains a first position in which an inter-vehicle gap in a traveling direction of the host vehicle and the preceding vehicle is relatively small as the target traveling position when the control performance of the behavior in the left and right directions of the host vehicle is high, and obtains a second position in which the inter-vehicle gap is relatively large as the target traveling position when the control performance of the behavior in the left and right directions of the host vehicle is low, and the control performance is determined on a basis of at least one from among a response performance of the host vehicle, an assist performance of the host vehicle, and driving skills of a driver of the host vehicle.

2. The vehicle travel support device according to claim 1, wherein the air resistance detection unit further acquires the air resistance distribution in forward and backward directions of the host vehicle.

3. The vehicle travel support device according to claim 1, wherein the electronic control unit further includes an environmental information acquisition unit configured to acquire environmental information around the host vehicle, wherein the target traveling position determination unit determines the target traveling position on a basis of the air resistance distribution and the environmental information.

\* \* \* \* \*